July 9, 1946.  C. B. BREEDLOVE  2,403,496
COMBINED THREADED FASTENER AND ANCHOR NUT
Filed Nov. 17, 1943
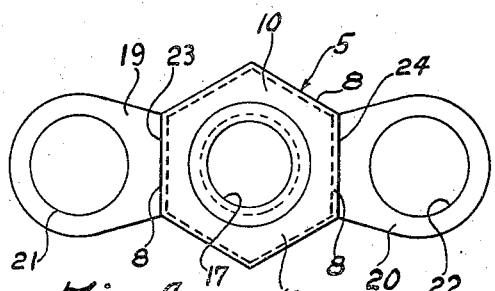
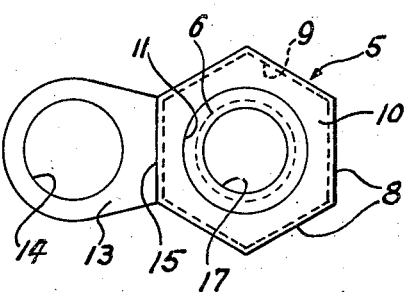
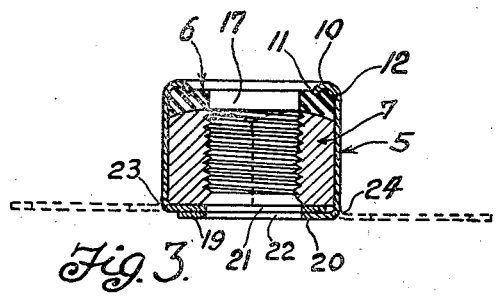
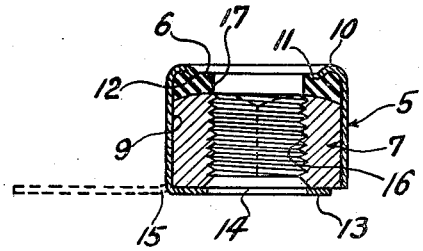
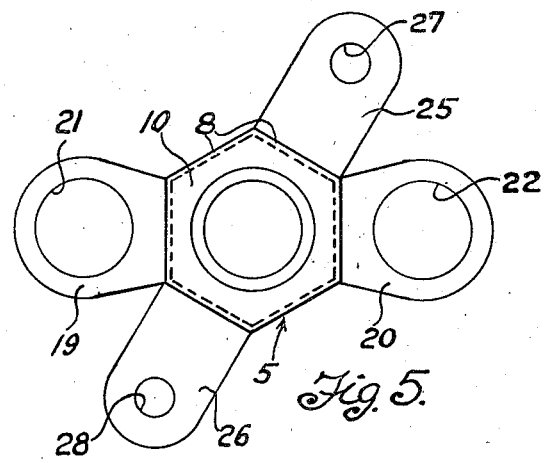
Inventor
CHARLES B. BREEDLOVE.
By Barthel + Bugbee
Attorney Patented July 9, 1946

2,403,496

UNITED STATES PATENT OFFICE 2,403,496

COMBINED THREADED FASTENER AND ANCHOR NUT

Charles B. Breedlove, Detroit, Mich.

Application November 17, 1943, Serial No. 510,626

2 Claims. (Cl. 85—32)

The present invention relates to improvements in self-locking threaded fasteners, and more particularly, to threaded fasteners of the anchor nut type.

The primary object of this invention is to provide a threaded fastener of the above-mentioned type which is economical to manufacture, easy to assemble and which will securely fasten various members together.

Another object of the invention is to provide a threaded fastener of the anchor nut type in which the various parts will be held in assembled relation and compact form and which will lend itself readily to universal use in various applications.

Another object of the invention is to provide a threaded fastener of the self-locking anchor nut type including a polygonal-shaped shell member having anchoring wing extensions arranged on opposite sides of the shell member to facilitate the attachment of the anchor nut to a support and to provide other wing extensions on the shell member which are bent inwardly to form nut retaining members as well as lock washers.

Another object of the invention is to provide a threaded fastener of the self-locking, anchoring nut type in which a friction washer is retained in position adjacent the top of the threaded fastener by a conventional nut snugly fitted within the shell member and said nut is held against removal by means of a wing extension bent therebeneath so as to form another washer for engaging the surface of a support or piece of work.

Another object of the invention is to provide a threaded fastener of the above-mentioned type in which the friction washer is adapted to be slightly expanded when the threaded fastener is tightened in place on a bolt so that said expansion will cause the bolt to be tightly gripped and held against accidental displacement.

Another object of the invention is to provide a threaded fastener of the self-locking anchor nut type in which the shell member is formed with angularly disposed wall portions adapted to form a cavity of polygonal shape which will mate with the flats of the nut and to provide the angularly disposed wall portions with wing extensions so bent and shaped as to provide a washer beneath the nut which performs a twofold purpose such as a lock washer and a retaining member for the nut to hold the nut from being dislodged before a bolt is applied to the threaded fastener.

Other objects and advantages of the invention will become apparent during the course of the following description of the accompanying drawing, wherein:

Figure 1 is a cross-sectional view of a preferred embodiment of the invention, illustrating a self-locking threaded fastener having a single wing extension for retaining the nut in place and forming a lock washer for the threaded fastener;

Figure 2 is a top plan view of the self-locking threaded fastener showing the wing extension prior to the bending thereof into position as shown in Figure 1;

Figure 3 is a cross-sectional view of a modified form of the invention illustrating a self-locking threaded fastener having a pair of oppositely disposed wing extensions to form combined lock washers and nut retaining members;

Figure 4 is a top plan view of the modification shown in Figure 3 illustrating the combined nut retaining members and lock washers in their extended position; and Figure 5 is a top plan view of a further modified form of the invention, illustrating a plurality of wing extensions formed on the shell with alternate opposite wings being adapted to be bent inwardly to form combined lock washers and nut retaining members with the intermediate wing extensions forming anchor strips for attachment to a suitable support.

In the drawing, wherein for the purpose of illustrating the invention attention is first directed to Figures 1 and 2, there is shown a preferred embodiment of the self-locking nut having a single combined lockwasher and nut retainer.

Generally, the threaded fastener comprises a shell member 5, a washer 6 and a nut 7 arranged in a unique and novel manner to provide a threaded fastener which will frictionally grip the threads of the bolt upon which it is placed and to provide a second lock washer to increase the frictional resistance against removal of the fastener.

The shell member 5 is of polygonal shape and is stamped to provide relatively straight wall portions 8 angularly connected to provide a polygonal-shaped recess 9. The ends of the shell 5 are open and the upper end is flanged as at 10 to provide an inwardly extending beaded portion terminating in a downwardly rolled free edge 11. The inwardly extending flange 10 is adapted to form a seat for a thread-gripping washer 12 fitted within the shell 5 in the cavity 9 thereof.

The nut 7 is of a general shape and contour to be received in the polygonal recess 7 of the shell member 5 so that the flats of said nut will frictionally engage the straight wall portions 8 of the shell 5 and be thus held in position therein. It is intended to form the shell 5 of such dimensions as to provide a snug fit between the straight wall portions 8 of the shell and the nut. Also, the nut may be formed of a relatively lightweight metal such as aluminum or alloys thereof.

Formed integral with one of the straight wall portions 8 of the shell 5 is a wing extension or tab 13 having a diameter equal to the smaller diameter of the shell 5. A bolt-receiving opening 14 is formed in the wing extension 13 and the outer edge of said wing extension is rounded to conform to the shape and general contour of the threaded fastener. As shown in Figure 2, the wing extension or tab 13 is adapted to be folded along the line 15 so as to be bent beneath the nut 7 as shown clearly in Figure 1, after the nut has been fitted into the shell 5 so that its top edge engages and firmly presses against the washer 6.

The nut 7 is provided with a threaded opening 16 slightly smaller in diameter than the opening 14 in the washer extension or tab 13 and said threaded opening 16 is formed slightly greater in diameter than the opening 17 in the washer 6. The washer tab 13 will aid in preventing rotation of the threaded fastener relative to a support or piece of work while the washer 6 will have threads impressed therein by a bolt passing through the opening or bore 17 so that said impressed threads will frictionally grip the threads of the bolt and further assist in preventing rotation of said nut on the bolt.

In addition to forming a lock washer, the washer tab 13 overlies the open end of the shell 5 and is presented against the lower wall of the nut 5 so as to prevent accidental separation of the shell and nut when the threaded fastener is uncoupled from a bolt or the like.

Attention now is directed to Figures 3 and 4 wherein the structure shown is similar to that described in connection with Figures 1 and 2 except that there are two lock washer wing extensions 19 and 20 shown as being formed integral with diametrically opposed straight wall portions 8 of the polygonal shell 5. As in Figures 1 and 2, the wing extensions 19 and 20 are provided with bolt-receiving openings 21 and 22 of substantially the same proportion as the bolt-receiving opening 14 and said wing extensions 19 and 20 are adapted to be bent and folded beneath the nut 7 on the fold lines 23 and 24 respectively so as to underlie the nut and prevent separation of the parts of the threaded fastener. As shown in Figure 3, the wing extension washers 19 and 20 are bent and folded so that their openings 21 and 22 are in registry and alignment so as to permit the passage of a bolt or the like therethrough.

The wing extension washers are in engagement with the under surface of the nut 7 so as to be positioned between the work and said nut. When the threaded fastener is uncoupled from a bolt, the washer extension wings engage the bottom surface of the nut and retain the same within the polygonal cavity 9 and prevent separation of the nut and self-locking washer 6 from their respective positions in the polygonal shell 5.

In the further modified form of the invention shown in Figure 5, the shell 5, washer 6 and nut 7 are identical in formation and arrangement to the shell shown in Figures 3 and 4 except that another diametrically opposed pair of straight wall portions 8 of the shell 5 is provided with wing extensions 25 and 26 having openings 27 and 28 respectively in their free ends to accommodate rivets for anchoring the threaded fastener to a support or piece of work. The lock washer wing extensions 19 and 20 as in Figures 2 and 4 are folded from the position shown in Figure 5 to underlie the nut contained in the shell 5. In the structure shown in Figure 5, the assembled threaded fastener provides an anchor nut of the self-locking type which can be constructed from relatively thin gauge metal and which may be anchored in place in positions not readily accessible with fasteners of ordinary construction.

In all of the embodiments of the invention, the lock washer wing extensions retain the nut 7 in place and urge the same into engagement with the washer 6 which may be formed of a relatively soft material or metal so as to force the washer into tight engagement with the free edge 11 of the inturned flange 10.

It is to be understood that the forms of the inventions herewith shown and described are to be taken as preferred embodiments of the same and that various changes in the size, shape and arrangement of parts may be resorted to without departing from the spirit of the invention or the scope of the subjoined claims.

What I claim is:

1. A threaded fastener comprising a shell member having a polygonal cavity, an inwardly extending continuous annular flange at one end of said shell member, a shelf-locking thread-gripping washer mounted in said shell seated against said flange, a nut snugly fitted in said cavity, combined lockwasher and nut-retaining wing extensions formed integral with said shell member and projecting from diametrically opposite walls thereof adapted to underlie said nut with their bolt-receiving openings in registry and arranged in overlapping relation whereby to receive a bolt and prevent separation of said shell and nut when the fastener is assembled on a bolt member, and other wing extensions formed on said shell member projecting from opposite sides thereof to provide anchor lug members, said shell member being of a size equal to the over all size of the nut and washer to confine and house said nut and washer and to retain the bores of the nut and washer in axial alignment.

2. A threaded fastener comprising a shell member having a polygonal cavity, an inwardly extending continuous annular flange at one end of said shell member, a self-locking thread-gripping washer mounted in said shell seated against said flange, a nut snugly fitted in said cavity, combined lock washer and nut-retaining wing extensions formed integral with said shell member and projecting from diametrically opposite walls thereof adapted to underlie said nut with their bolt-receiving openings in registry and arranged in overlapping relation whereby to receive a bolt and prevent separation of said shell and nut when the fastener is assembled on a bolt member, and another wing extension formed on said shell member and projecting laterally from one side thereof whereby to provide an anchor lug member, said shell member being of a size equal to the overall size of the nut and washer to confine and house said nut and washer and to retain the bores of the nut and washer in axial alignment.

CHARLES B. BREEDLOVE.